(12) United States Patent
Wright et al.

(10) Patent No.: US 6,219,528 B1
(45) Date of Patent: Apr. 17, 2001

(54) DYNAMIC POWER CONTROL WITH ADAPTIVE REFERENCE LEVEL

(75) Inventors: David A. Wright, Solana Beach; James E. Justiss, Rancho Palos Verdes; Jean Tsao, Hermosa Beach, all of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/106,651

(22) Filed: Jun. 29, 1998

(51) Int. Cl.[7] .................................................. H04B 7/185
(52) U.S. Cl. ....................... 455/13.4; 455/12.1; 455/13.1; 370/316; 370/318; 370/321
(58) Field of Search ............................ 455/9, 12.1, 13.1, 455/13.4, 427, 428, 429, 522, 69, 115, 430; 370/316, 318, 321

(56) References Cited

U.S. PATENT DOCUMENTS

| | | | |
|---|---|---|---|
| 5,530,920 | * 6/1996 | Takeda ................................. | 455/102 |
| 5,768,684 | * 6/1998 | Grubb et al. ......................... | 455/13.4 |
| 5,812,539 | * 9/1998 | Dent ..................................... | 370/321 |
| 5,864,547 | * 1/1999 | Strodtbeck et al. ................. | 370/318 |
| 5,991,279 | * 11/1999 | Haugli et al. ........................ | 370/311 |
| 6,085,067 | * 7/2000 | Gallagher et al. .................. | 455/13.1 |
| 6,097,752 | * 8/2000 | Wiedeman et al. ................. | 375/200 |

* cited by examiner

Primary Examiner—Dwayne Bost
Assistant Examiner—Temica M. Davis
(74) Attorney, Agent, or Firm—T. Gudmestad

(57) ABSTRACT

The disclosure describes a method of adjusting a reference level for uplink signal power for use in a dynamic power control system with satellite-based measurements in a satellite communications system. The uplink signal power for a plurality of received uplink signals is measured and combined to determine whether a signal power reference level requires adjustment. The signal powers of a plurality of uplink signals are measured at the satellite and the received signals are validated to ensure the signals are acceptable for use in adjusting the reference level. The valid signals are used to calculate an average signal power of the measured uplink signal powers, with the calculated average being compared to the current value of the reference level. Based on the comparison, the reference level either retains the current value or is reset to an adjusted value.

23 Claims, 3 Drawing Sheets

DYNAMIC POWER CONTROL WITH ADAPTIVE REFERENCE LEVEL

BACKGROUND OF THE INVENTION

1. Field of the Invention

The present invention relates generally to satellite communications and, more particularly, to dynamic power control with an adaptive reference level in a point-to-point satellite communications system.

2. Description of Related Art

Communication satellites have the capability of receiving uplink signals from earth-based terminals, amplifying and translating the uplink signals into downlink signals, and retransmitting the downlink signals to receiving terminals. Such communications systems permit two types of communications. In a typical broadcast system, such as for distributing television programming, an uplink signal from a single broadcast transmitter is retransmitted by the satellite for simultaneous reception by multiple receiving terminals. In two-way systems, such as for normal telecommunications, uplink signals from many uplinking terminals are transmitted with no central coordination to a single satellite. Each uplink signal is addressed to and retransmitted for reception by one or more receiving terminals. Both types of systems permit concurrent receipt and processing of multiple uplink signals.

The satellites in both broadcast and two-way systems are capable of receiving uplink signals from multiple terminals using time-division multiple access (TDMA), frequency-division multiple access (FDMA) or a combination of the two access methods. In TDMA, each terminal uses the entire uplink bandwidth for a portion of the time. A synchronization arrangement which controls the time of transmission of each terminal is required. In an ideal situation, each terminal transmits uplink signals that arrive at the allotted time without overlap or gaps. Unfortunately, in the real world terminals sometimes transmit TDMA uplink signals that overstep their allotted time slot, thereby jamming the signals of other terminals. In these cases, the relative transmission timing for the offending terminals must be controlled to ensure the uplink signals arrive in the proper time slot.

In FDMA, the uplink bandwidth is subdivided and portions are assigned to different terminals. Power levels of the uplink signals must be controlled to reduce interference between the subdivisions. An FDMA uplink signal will leak, due to hardware imperfections, into the adjoining frequency bandwidth subdivision. If the uplink signal has too much power, the FDMA leakage will jam the adjoining subdivision. In this case, the relative signal powers of the uplink signals in adjoining subdivisions must be adjusted to minimize interference due to signal leakage.

In a broadcast satellite communications system, transmission stations transmit to a satellite uplink signals which are broadcast and simultaneously received by multiple receiver stations. The transmission station transmits an uplink signal at a predetermined uplink frequency to an orbiting satellite. The satellite receives the uplink signal and upconverts or downconverts the uplink signal to a downlink signal at a predetermined downlink frequency. The downlink signal is then retransmitted in a broadcast beam for simultaneous reception by multiple receiver stations. Typically, the transmission station is within the area encompassed by the broadcast beam and, therefore, is capable of receiving the downlink signal.

In broadcast systems as described, uplink power control and time synchronization can be performed at the transmission station. Power control is typically performed by the transmission station measuring the power of a beacon or a communications carrier signal in the broadcast beam from the satellite. The beacon or signal is transmitted with a predetermined power in either the uplink frequency band or the downlink frequency band. The transmission station measures the power of the received beacon or signal, and determines whether the uplink signal power should be adjusted to allow for variations in signal fade and interference at the uplink signal frequency. In these systems, the uplink signal powers can be increased or decreased as is necessary to overcome signal fade because the uplink signals from one transmission station do not interfere with the uplink signals of the other transmission stations of the system.

Time synchronization in broadcast satellite communications systems and systems having central coordination of uplink signal transmissions is usually performed by the transmission station measuring its own transmission as it appears in the downlink signal. The timing relationship between the uplink signal and the downlink signal is constant as the uplink signal is received, converted to the downlink signal, amplified and retransmitted by the satellite. Therefore, the time of receipt of the downlink signal at the transmission station can be used to adjust the transmission time of the uplink signal to ensure that the uplink signal arrives at the satellite at the allotted time.

Previous alternatives for uplink power control and timing synchronization are not applicable in the uncoordinated two-way systems as described herein. Specifically, the two-way system described herein interconnects multiple, geographically disparate spot beam coverage areas with a regenerative satellite payload and no centralized control station. The payload demodulates uplink signals into their constituent packetized bit streams and routes the packets to the downlink spotbeam(s) specified within the packet header. Thus, the originating terminal may or may not receive the downlink manifestation of the uplink signal. Moreover, both the timing and the signal-to-noise ratio of the uplink signal are removed by the demodulation and routing operations. Demodulation reduces the signal to the binary information stream, and routing introduces random queuing delays. Thus, neither the timing nor the received signal strength is discernible from the downlinked data.

Another problem exists in systems where low power uplink terminals are used to reduce size, cost and power consumption. In these systems, the uplink terminals cannot indiscriminately increase their uplink signal power to compensate for other uplink signals that leak into their subdivisions. Even in systems with uplink terminals capable of transmitting signals with higher uplink signal powers, the terminals cannot indescriminantly increase their uplink signal power lest system runaway occur. Consequently, a power control strategy is necessary in systems without central coordinated uplinks and using either low power or high power uplink terminals wherein the terminals are self-policing and each control their own uplink signal power.

For these reasons, a need exists for a method for satellite-based uplink power control and time synchronization in satellite communications systems.

SUMMARY OF THE INVENTION

The present invention is directed to a method of adjusting a reference level for uplink signal power for use in a dynamic power control system with satellite-based measurements in a satellite communications system.

According to one aspect of the present invention, the uplink signal power for a plurality of received uplink signals is measured and combined to determine whether a signal power reference level requires adjustment. The signal powers of a plurality of signals are measured at the satellite and the received signals are validated to ensure the signals are acceptable for use in adjusting the reference level. The valid signals are used to calculate an average signal power of the measured uplink signal powers, with the calculated average being compared to the current value of the reference level. Based on the comparison, the reference level either retains the current value or is reset to an adjusted value.

According to another aspect of the present invention, each received uplink signal is subjected to one or more validation steps to determine whether the uplink signal is a valid signal for use in adjusting the reference level. One validation step is a determination that the received uplink signal did not arrive at the satellite in an unassigned time slot. Another validation step is a determination that a first received signal did not arrive at the satellite concurrently with a second received signal. Yet another validation step is a determination that the received uplink signal is authorized for receipt by the satellite.

The present invention may best be understood with reference to the following description when considered with the accompanying drawings.

DETAILED DESCRIPTION OF THE PREFERRED EMBODIMENTS

Figure 1:
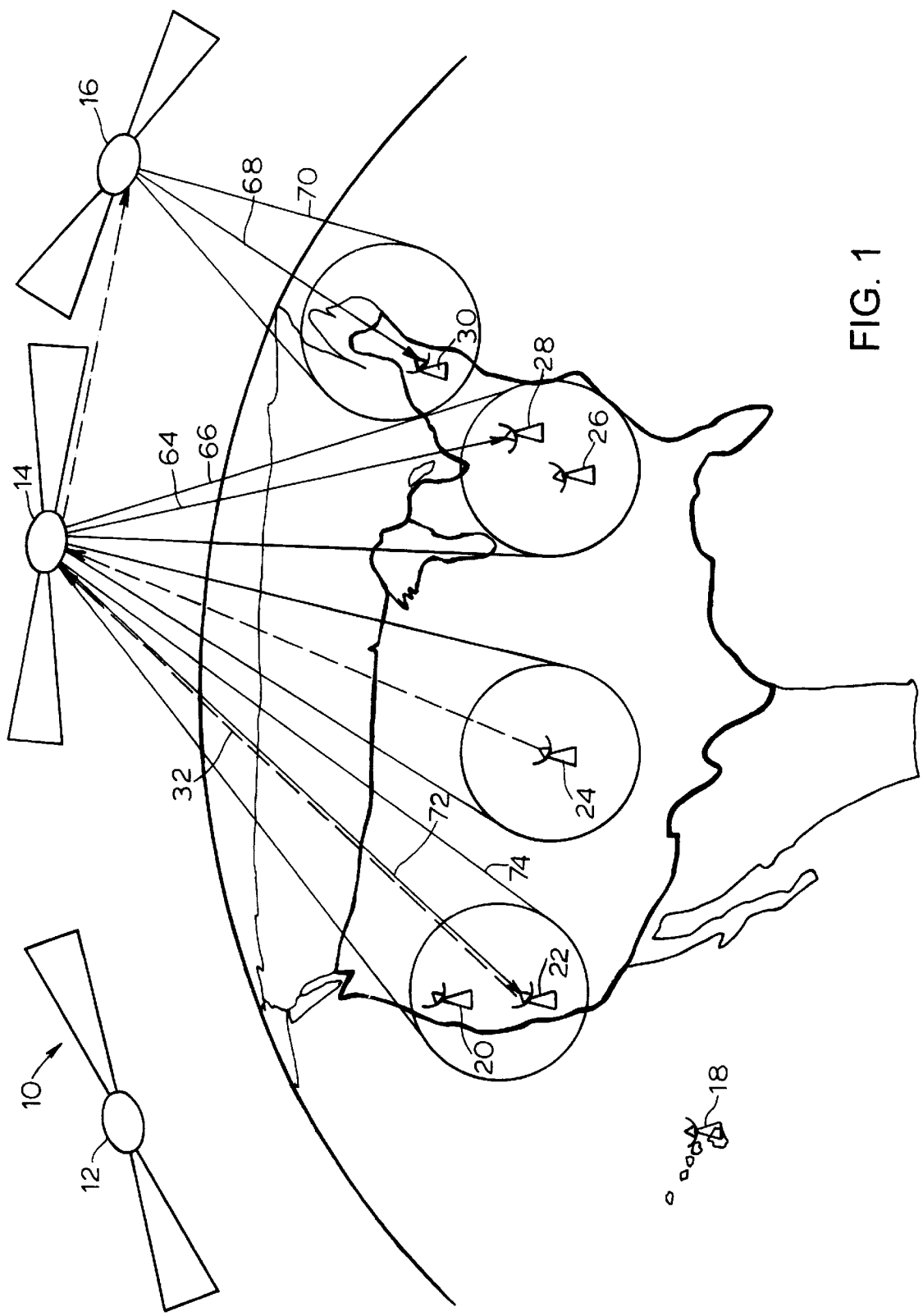
FIG. 1 is a diagram of a point-to-point satellite communication system capable of implementing the method of the present invention.
Figure 2:
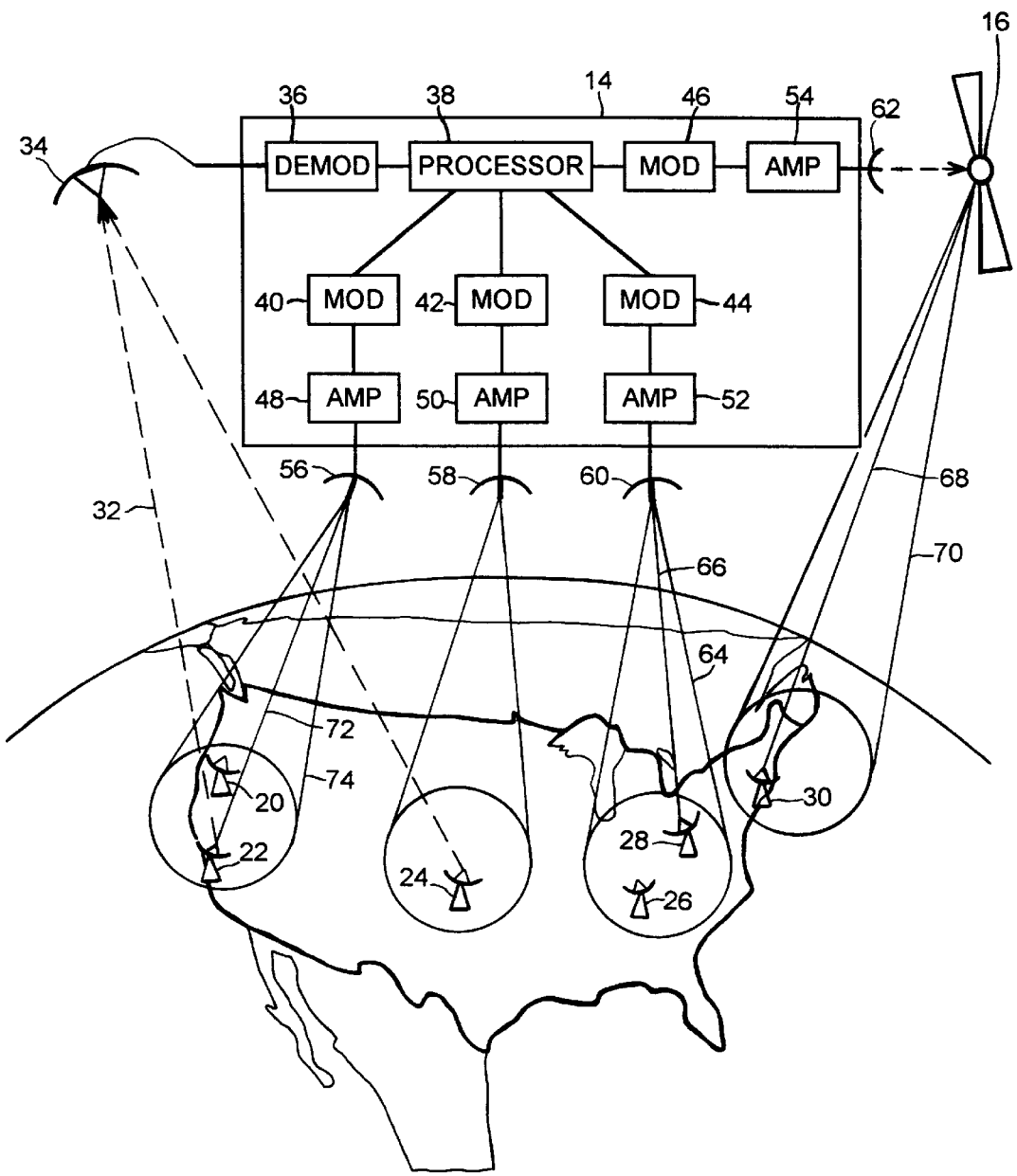
FIG. 2 is a diagram of the point-to-point satellite communications system of FIG. 1 including a block diagram of a point-to-point communication satellite capable of implementing the present invention.

Systems are currently being developed which allow satellite communications between many geographically dispersed uplink terminals with no central coordination using digital data packets. One example of such a system is illustrated in FIGS. 1 and 2. A communications system 10 is comprised of a network of one or more satellites 12–16 which services many earth-based terminals 18–30, and allows one terminal, such as terminal 22, to communicate directly with a second terminal, terminal 28, by transmitting a series of data packets specifically addressed to the second terminal 28. Each satellite 12–16 has the ability to receive uplink signals containing digital data packets from originating terminals and determine the target terminals to which the data packets are addressed. The satellites then route the data packets to a transmitter designated to transmit a downlink signal to the target terminal in a spot beam.

In the communications system 10, an originating terminal 22 creates a data packet containing header information identifying a target terminal 28 to which the information is addressed, and a payload of digital data. The originating terminal 22 modulates the data packet onto an uplink carrier frequency to create an uplink signal 32 which is transmitted to a satellite 14 within the system 10. The satellite 14 receives the uplink signal 32 at a receiving antenna 34, and demodulator 36 demodulates the uplink signal 32 and converts the uplink signal 32 back into digital data. A processor 38 identifies the target terminal 28 from the header information and routes the data packet for transmission to the target terminal 28.

The data packets must be reconverted into a transmittable downlink signal for transmission to the target terminal. The processor 38 routes the data packet to the appropriate modulators 40–46 which modulate the data packets onto the downlink carrier frequency to create the downlink signals. The downlink signals are amplified by amplifiers 48–54 and retransmitted to the target terminals in spot beams by transmitters 56–62. In the present example, data packets addressed to target terminal 28 are routed to modulator 44, amplifier 52 and transmitter 60, thereby creating and transmitting downlink signal 64 in spot beam 66.

Data packet routing may include hand-offs of the data packets to other satellites 12, 16 within the system 10 that service the target terminals. For example, data transmitted from terminal 24 to terminal 30 would require an inter-satellite hand-off. Processor 38 of satellite 14 routes the data packets from terminal 24 to modulator 46, amplifier 54 and transmitter 62 for transmission to satellite 16. The processor for satellite 16 then routes the data packets to an on-board modulator, amplifier and transmitter for retransmission to terminal 30.

At the target terminal 28, the downlink signal 64 is demodulated and converted to digital data. The target terminal 28 only processes the data packets addressed to that particular terminal. Terminal 28 discards data packets addressed to other terminals, such as terminal 26, which are serviced by the spot beam 66.

The system illustrated in FIGS. 1 and 2 allows a first terminal send messages directly to a second terminal. In such a system, uplink power control and time synchronization can be accomplished with satellite-based measurements. In a first embodiment, a terminal polls the satellite, requesting information of the uplink signal power and the transmission timing. Terminal 22 transmits a data packet in the uplink signal 32 which contains a measurement request for the satellite 14. The data packet has a "self-addressed" format which specifies terminal 22 as the target terminal for the downlink signal 72.

The uplink signal 32 is received by the antenna 34 and transferred to demodulator 36. Demodulator 36 demodulates the uplink signal 32 and converts the signal back into digital data. Demodulator 36 also measures the uplink signal power and the arrival time of the uplink signal 32. Processor 38 determines from the header information in the data packet that the packet is addressed to terminal 22 and that terminal 22 is requesting information of the measured power and arrival time of the uplink signal. Processor 38 responds to the measurement request in the data packet by adding the information to the data packet and routing the data packet to modulator 40, amplifier 48 and transmitter 56 for transmission to terminal 22 in the downlink signal 72 in spot beam 74. The terminal 22 receives the downlink signal 72 and determines that the data packet is addressed to the terminal 22. The terminal 22 adjusts the uplink signal power, the transmission timing, or both as dictated by the information in the data packet.

Parameters of a power control process determine how the terminal will make the power and timing adjustments. However, the scope of the present invention is not limited to the use of a particular power control process. Additionally, the location of execution of the power control process is not critical to the method of the present invention. Execution could occur within the satellite 14 at the processor 38. In this case, the processor 38 could format the data packet with the adjusted power level and transmission timing, or with some intermediate information which is used by the terminal 22 to arrive at the adjusted values. Conversely, the processor 38 could format the data packet with the raw data of the uplink power and arrival time, with execution of the power control process occurring at the terminal 22. Other methods of implementing a power control and timing synchronization process are contemplated by the present invention and will be obvious to those of ordinary skill in the art.

In another embodiment, power control and time synchronization occur continuously as uplink signals are received by the satellite. In this embodiment, each uplink data packet contains address information identifying the originating terminal. The demodulator 36 measures the uplink power and arrival time of every uplink signal and the processor 38 formats a new data packet with the address of the originating terminal and information of the measured uplink power and arrival time. The processor 38 then routes the new data packet to the appropriate spot beam. This embodiment has the advantage that no conditional action is necessary to respond to a change in the link environment on the part of either the satellite or the terminal.

In another alternative embodiment, the satellite evaluates the power and timing measurements to determine how and when a terminal should adjust the uplink signal power and transmission timing. If adjustment is necessary, the satellite directly commands the terminal to adjust the power level, transmission timing, or both by formatting and transmitting a new data packet. In this embodiment, the satellite only formats and transmits new data packets for a given terminal when an adjustment is necessary.

The uplink power control and time synchronization system described herein exploits the processing already required on-board the satellite to generate the required measurements which are reformatted and transmitted to the originating terminal. The satellite demodulator measures both the power level and the time of arrival of the uplink signal. The terminal filters the satellite-supplied data to adjust the uplink power and transmission timing. This assures a high quality link in two respects. First, it adapts transmit power to changing signal fades while keeping interference on other links to a minimum. Second, it adapts uplink signal transmission time to changing satellite range, allowing a tight guard time for high throughput efficiency.

In a dynamic uplink signal power control system of the type described in relation to FIGS. 1–2, the measured uplink signal power is compared to a signal power reference level to determine whether the terminal should adjust the uplink signal power for subsequent transmissions. In one aspect of the present invention, the reference level is adjusted to reflect changes in the operating environment of the satellite. Some characteristics of the system and the environment affect the satellite's measurement of the uplink signal power and can cause the measured signal power to vary over time for signals with the same actual signal power. These characteristics include frequency dependent response, age of the satellite components, temperature and signal interference. Consequently, the dynamic uplink signal power control system requires a method for adapting the signal power reference level to compensate for the varying effects while operating autonomously and with stability. This method operates under the assumption that over time and across carrier frequencies the originating terminals transmit uplink signals at the correct uplink signal power and that the reference level must be updated to account for variations that cause the measured signal power to differ from the actual signal power.

Figure 3:
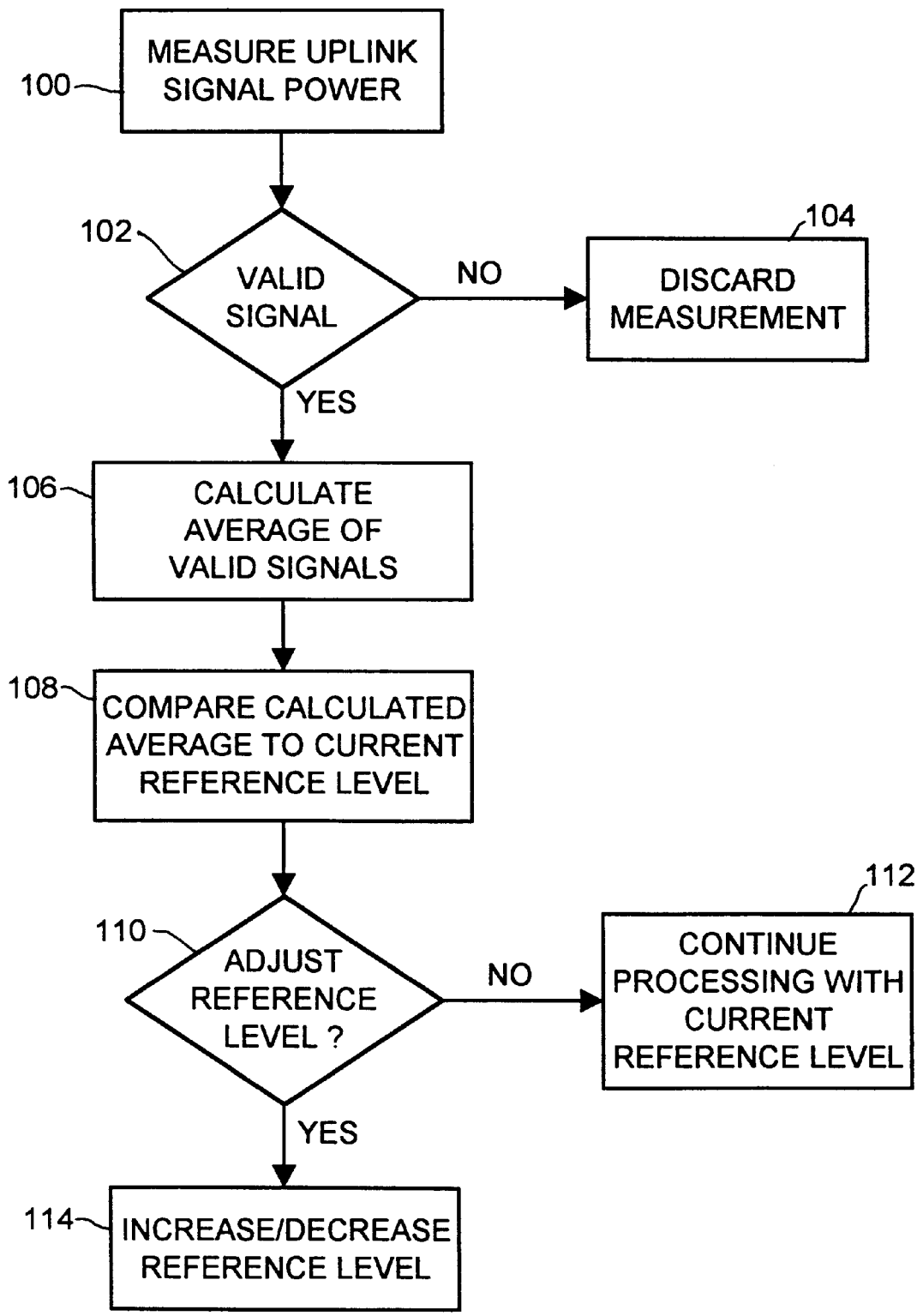
FIG. 3 is a flow diagram of a method of adaptive reference level updates in a dynamic power control system according to the present invention for use in the point-to-point satellite communications system of FIGS. 1 and 2.

An adaptive reference level update process is illustrated in the flow diagram of FIG. 3. As uplink signals are received by the satellite, the satellite measures the uplink signal power of the received signals 100. The received uplink signals are subjected to one or more validation steps 102 to ensure that the received uplink signal is a valid signal for inclusion in the reference level update process. The measured uplink signal power is discarded from the reference level update process if the received uplink signal fails the validation step or steps 102.

For the received uplink signals which pass the validation steps 102, the measured uplink signal powers are combined at an averaging filter to calculate an average uplink signal power 106. This includes uplink signals received in multiple time slots (TDMA), received across multiple carrier frequencies (FDMA) or both. A plurality of measured uplink signal powers are combined to calculate the average uplink signal power in a given update cycle based on the assumption that over time and across carrier frequencies the originating terminals are transmitting uplink signals at the correct uplink signal power. A number of known filtering algorithms are useable in the calculation step 106, such as averaging a number of measurements or using a moving average filter with a long time constant. However, the reference level update process is not dependent upon the use of a particular averaging algorithm for combining the measured uplink signal power. Other averaging algorithms that can be used in the update process described herein will be obvious to those of ordinary skill in the art and are contemplated by the inventors as having use in connection with the present invention.

The calculated average uplink signal power 106 is compared to the current reference level value 108 to determine whether the reference level requires adjustment 110. The difference between the current reference level and the calculated average uplink signal power is compared to a system design goal which represents the acceptable satellite error performance level. If the difference between the current reference level and the calculated average uplink signal power is within the system design goal, the dynamic power control system continues processing with the current reference level 112. Conversely, if the difference is greater than system design goal, the reference level is increased or decreased 114 as appropriate based on the calculated average. The adjusted reference level more accurately reflects the current operating conditions at the satellite and will drive subsequent uplink signal power updates to within the system design goal.

As discussed above, the received uplink signals must pass one or more validation steps 102 for inclusion in the calculated average uplink signal power. One validation step can include a determination that the received uplink signal arrived at the satellite in the time slot assigned to the originating terminal. Uplink signals arriving in the time slot assigned to another terminal, or arriving in a time slot which is unassigned, will be discarded from the update process. Another validation step will ensure that two or more uplink signals arriving in the same time slot concurrently are discarded. This includes discarding the signals that are not assigned to the time slot as well as the signal that is assigned to the time slot. Additionally, received uplink signals are validated to ensure that the signal is authorized to be received and processed by the satellite, with unauthorized signals being discarded from the update process. These examples of validation steps are illustrative of the types of validation which may be required in a reference level update process.

The reference level update can be performed in different locations within the satellite communications system. The update may be performed on-board the satellite, in each originating terminal or in a remote location such as a control station or a monitoring terminal. The satellite provides a central location for the storage of the reference level and execution of the update process. However, the constraints of the satellite's mechanical and electronic architecture may necessitate distribution of the processing and storage required by the update process to other components of the system.

In one alternative, the satellite would perform the measurement and validation steps 100, 102 and transmit information of the measured uplink signal power to the originating terminal which would then calculate an average signal power 106 and perform the comparison and update steps 108, 110, 112 and 114 for a reference level stored at the originating terminal. In another alternative, the satellite would transmit information of the measured uplink signal powers to a remote location, such as a control station or a monitoring terminal, which would determine the adjusted value of the reference level and transmit the adjusted value to the satellite and the terminals. These examples of distributing the steps performed in the update process are illustrative only of the types of distribution which may be required in a reference level update process. The implementation of the particular satellite communications system will dictate which components will perform the various steps in the process and other distributions of steps than those presented herein are contemplated by the inventors as having use in connection with the present invention.

Thus it can be seen from the foregoing detailed descriptions and illustrations that the method of the present invention provides numerous advantages. In particular, the method of the present invention has advantages over active uplink power control systems that adjust the transmission power of terminals relative to a reference level that is distributed from a central control site. Because the satellite measurements for power control have an environment that changes over time, power control from a central control site can result in either an inaccurate reference level or the necessity of a complex data handling and computing system to issue updates to the reference level. The present invention derives a reference value in a way that allows the system to automatically adapt to slow-changing characteristics of the satellite equipment and the environment. This allows the system to have accurate, responsive control of terminal transmission power while maintaining the aggregate received power at the satellite from all the terminals serviced thereby within the design limits.

While the present invention has been described with reference to specific examples, which are intended to be illustrative only and not to be limiting of the invention, it will be apparent to those of ordinary skill in the art that changes, additions, and/or deletions may be made to the disclosed embodiments without departing from the spirit and scope of the invention.

What is claimed is:

1. A method of adjusting a reference level for use in a dynamic power control system with satellite-based measurements in a satellite communications system, the method comprising the steps of:

measuring an uplink signal power of a plurality of uplink signals received at a satellite, the uplink signals transmitted by a plurality of terminals;

determining whether each received uplink signal is a valid signal for use in adjusting the reference level, said reference level being a function of the uplink power received at the satellite;

comparing the measured uplink signal powers of the valid signals to a current value of the reference level; and adjusting the reference level to an adjusted value based on result of the comparison step.

2. The method of claim 1, wherein the determination step further comprises the step of determining that a received uplink signal is an invalid signal where the received uplink signal arrives at the satellite in an unassigned time slot.

3. The method of claim 1, wherein the determination step further comprises the step of determining that a first received uplink signal is an invalid signal where the first received uplink signal arrives at the satellite concurrently with a second received uplink signal.

4. The method of claim 1, wherein the determination step further comprises the step of determining that a received uplink signal is an invalid signal where the received uplink signal is not authorized for receipt by the satellite.

5. The method of claim 1, wherein the comparison step further comprises the steps of:

calculating an average of the measured uplink signal powers of the valid signals; and comparing the calculated average of the measured uplink signal powers to the current value of the reference level.

6. The method of claim 5, wherein the calculating step further comprises the step of calculating the average of the measured uplink signal powers of uplink signals received in a plurality of time slots.

7. The method of claim 5, wherein the calculating step further comprises the step of calculating the average of the measured uplink signal powers of uplink signals received in a plurality of carrier frequencies.

8. The method of claim 5, wherein the comparison step further comprises the step of comparing a difference between the calculated average and the current value of the reference level to a design goal.

9. The method of claim 1, wherein the reference level is stored at the satellite.

10. The method of claim 1, wherein the reference level is stored at a terminal and further comprising the step of transmitting information of the measured uplink signal powers to the terminal.

11. The met hod of claim 10, wherein the satellite calculates the adjusted value.

12. The method of claim 1, wherein the adjusting step further comprises the steps of:

transmitting information of the measured uplink signal powers to a remote location;

determining the adjusted value of the reference level at the remote location; and transmitting the adjusted value to the satellite and the terminals.

13. The method of claim 12, wherein the remote location is one of a control station and a monitoring terminal.

14. A method of adjusting a reference level having a current value for use in a dynamic power control system with satellite-based measurements in a satellite communications system, the method comprising the steps of:

measuring an uplink signal power of a plurality of uplink signals received at a satellite, the uplink signals transmitted by a plurality of terminals;

determining whether a received uplink signal is a valid signal for use in adjusting the reference level, said reference level being a function of the uplink power received at the satellite, a received uplink signal being an invalid signal for one of arriving at the satellite in an unassigned time slot, arriving at the satellite concurrently with a second received uplink signal, and not being authorized for receipt by the satellite;

comparing the measured uplink signal powers of the valid signals to the current value of the reference level; and adjusting the reference level to an adjusted value based on a result of the comparison step.

15. The method of claim 14, wherein the comparison step further comprises the steps of:

calculating an average of the measured uplink signal powers of the valid signals; and comparing the calculated average of the measured uplink signal powers to the current value of the reference level.

16. The method of claim 15, wherein the calculating step further comprises the step of calculating the average of the measured uplink signal powers of uplink signals received in a plurality of time slots.

17. The method of claim 15, wherein the calculating step further comprises the step of calculating the average of the measured uplink signal powers of uplink signals received in a plurality of carrier frequencies.

18. The method of claim 15, wherein the comparison step further comprises comparing a difference between the calculated average and the current value of the reference level to a design goal.

19. The method of claim 14, wherein the reference level is stored at the satellite.

20. The method of claim 14, wherein the reference level is stored at a terminal and further comprising the step of transmitting information of the measured uplink signal powers to the terminal.

21. The method of claim 20, wherein the satellite calculates the adjusted value.

22. The method of claim 14, wherein the adjusting step further comprises the steps of:

transmitting information of the measured uplink signal powers to a remote location;

determining the adjusted value of the reference level at the remote location; and transmitting the adjusted value to the satellite and the terminals.

23. The method of claim 22, wherein the remote location is one of a control station and a monitoring terminal.

* * * * *